United States Patent [19]

Ninane et al.

[11] Patent Number: 5,474,581
[45] Date of Patent: Dec. 12, 1995

[54] METHOD FOR PRODUCING AN AQUEOUS SODIUM CHLORIDE SOLUTION AND USE THEREOF

[75] Inventors: Léon Ninane, Dombasle-Sur-Meurthe; Jean-Francois Adam, Comps, both of France

[73] Assignee: Solvay (Société Anonyme), Brussels, Belgium

[21] Appl. No.: 185,934

[22] PCT Filed: Jul. 9, 1992

[86] PCT No.: PCT/EP92/01478

§ 371 Date: Mar. 18, 1994

§ 102(e) Date: Mar. 18, 1994

[87] PCT Pub. No.: WO93/02014

PCT Pub. Date: Feb. 4, 1993

[30] Foreign Application Priority Data

Jul. 19, 1991 [FR] France ..................... 91 09266

[51] Int. Cl.⁶ .............. C01D 3/08; C01B 7/00; A67D 3/00
[52] U.S. Cl. .................... 23/303; 423/240 R; 423/499.5; 588/205
[58] Field of Search ............. 423/240 R, 499.1, 423/499.5; 588/205, 206, 207; 23/303

[56] References Cited

U.S. PATENT DOCUMENTS

| | | | |
|---|---|---|---|
| 2,829,095 | 4/1958 | Oda et al. | 204/98 |
| 3,988,415 | 10/1976 | Barr | 423/491 |
| 4,002,564 | 1/1977 | Carbonel et al. | 210/38 R |
| 4,115,531 | 9/1978 | Optiz et al. | 423/488 |
| 4,617,180 | 10/1986 | Voss | 423/58 |
| 4,747,917 | 5/1988 | Reynolds et al. | 423/499.5 |
| 5,126,019 | 6/1992 | Rutherford et al. | 423/499.5 |
| 5,213,778 | 5/1993 | Sato | 423/240 R |
| 5,257,588 | 11/1993 | Kollmann | 423/240 |

FOREIGN PATENT DOCUMENTS

| | | |
|---|---|---|
| 1004126A3 | 5/1990 | Belgium . |
| 1003943A3 | 9/1990 | Belgium . |
| 0087934A1 | 9/1983 | European Pat. Off. . |
| 0253430A1 | 1/1988 | European Pat. Off. . |
| 0352847A1 | 1/1990 | European Pat. Off. . |
| 55-104632 | 8/1980 | Japan . |
| 60-38197 | 8/1985 | Japan . |
| 1375126 | 11/1974 | United Kingdom . |
| 2005723A | 4/1979 | United Kingdom . |

OTHER PUBLICATIONS

Chlorine, Its Manufacture, Properties And Uses. J. S. Sconce, Reinhold Publishing Corporation, New York, 1962, pp. 119–199.

Sodium Chloride, The Production and Properties of Salt and Brine. Dale W. Kaufmann, Reinhold Publishing Corporation, New York, 1960, pp. 204–275.

Ion–Exchange Purification of Feed Brine for Chlor–Alkali Electrolysis Cells; The Role of Duolite. The American Institute of Chemical Engineers, No. 219, vol. 78, 1982, pp. 46–53; J. J. Wolff and R. E. Anderson.

*Primary Examiner*—Gary P. Straub
*Attorney, Agent, or Firm*—Spencer, Frank & Schneider

[57] ABSTRACT

Method for producing an industrial aqueous sodium chloride solution (22) in which an aqueous solution of sodium chloride (20) containing polyvalent metals and constituting a mother liquor obtained from the precipitation (14) of hydroxides of said metals from an aqueous solution (6) of hydrochloric acid is obtained from washing (3,4) fumes (1) containing hydrogen chloride and originating from the oxidation of chlorinated products, is treated on a chelating Na-type resin. The aqueous sodium chloride solution obtained in this manner has applications in the production of aqueous sodium hydroxide solutions by means of electrolysis or electrodialysis and in the production of sodium chloride crystals by means of evaporation.

12 Claims, 1 Drawing Sheet

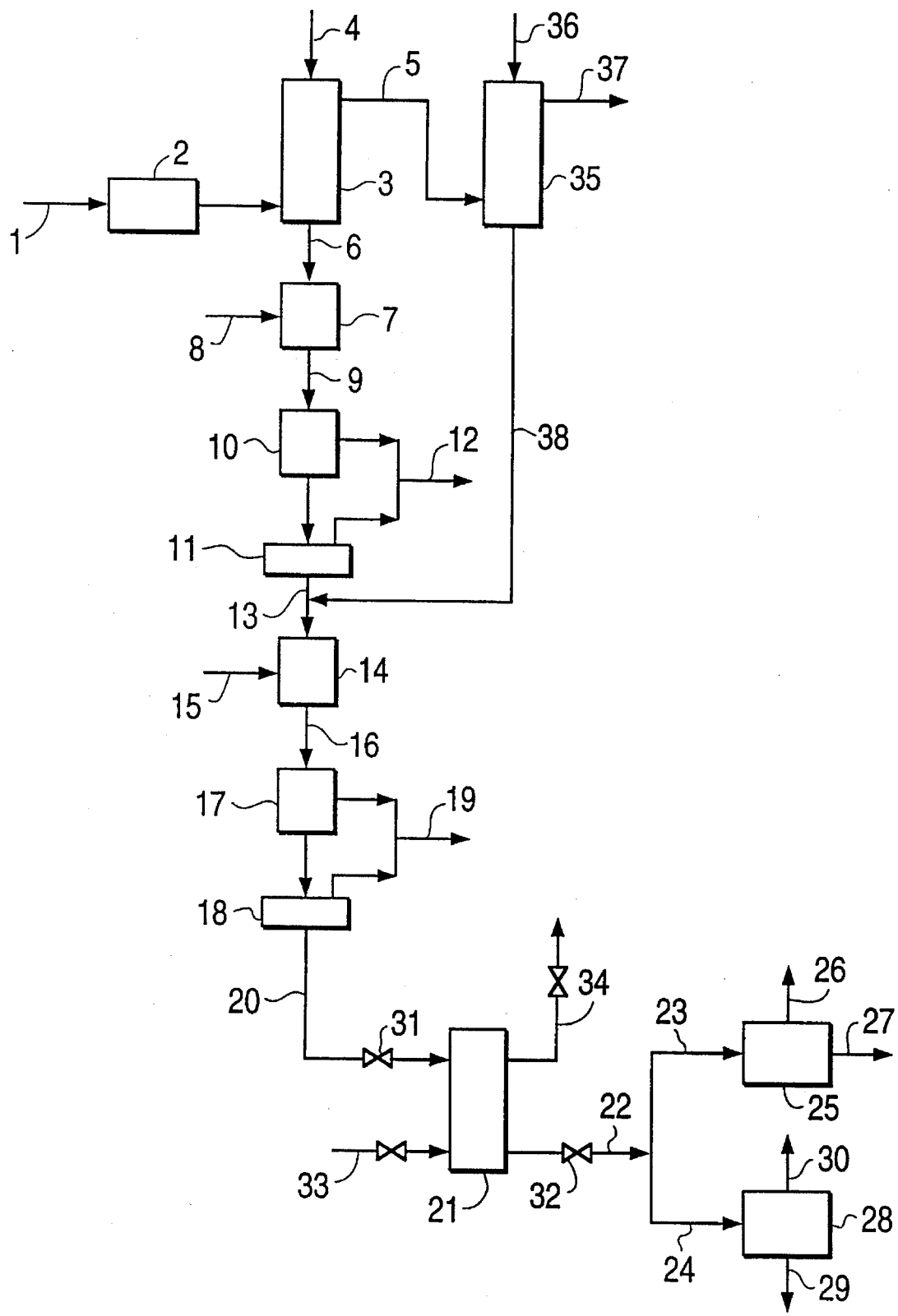

METHOD FOR PRODUCING AN AQUEOUS SODIUM CHLORIDE SOLUTION AND USE THEREOF

FIELD OF THE INVENTION

The invention relates to a method for producing an aqueous sodium chloride solutions for use in industrial methods.

TECHNOLOGY REVIEW

Aqueous sodium chloride solutions have important applications in industry. This is especially the case in industries producing sodium carbonate by the ammonium-soda method, and by the electrolytic processing method for chlorine and aqueous sodium hydroxide solutions.

These industrial methods usually require very pure aqueous sodium chloride solutions, notably not containing polyvalent metals such as, for example, calcium, magnesium, aluminum, iron, lead and zinc. This requirement is especially strict in case of electrolysis methods involving membranes which are selectively permeable to cations, such as perfluoropolymers comprising functional groups derived from carboxylic acid (GB 1,375,126). For these electrolysis methods, sodium chloride solutions are usually recommended whose polyvalent cation contents, notably, calcium cations, does not exceed 0.1 ppm (GB 2,005,723).

These aqueous solutions intended for electrolysis cells are usually obtained by dissolving common salt in water (Chlorine, Its Manufacture, Properties and Uses. J. S. Sconce, Reinhold Publishing Corporation, New York, 1962, Pages 119 and 123). However, the raw brines obtained by dissolving common salt in water have a polyvalent cation content which is generally too high to allow them to be used in electrolysis methods. Due to this fact, it was proposed to treat them on Na-type chelating resins, with the intention of extracting polyvalent cations. (The American Institute of Chemical Engineers, No. 219, Vol. 78, 1982, Pages 46–53; J. J. Wolff and R. E. Anderson, Ion-Exchange Purification of Feed Brine for Chlor-Alkali Electrolysis Cells; The Role of Duolite ES-467).

The document, JP-B-6038197, describes a method for recovering heavy metals present in residual waters from washing fumes. According to this method, the residual waters are alkalinized to precipitate heavy metals which are subsequently separated by decanting and filtering, and the aqueous solution collected from the filtration is treated successively on a chelating resin comprising sulfur ligands in order to recover the mercury, and on a chelating resin containing nitrogen ligands in order to recover the calcium and the other heavy metals. The aqueous solution collected at the end of this known method contains a high level of sodium chloride and its content of heavy metals is sufficiently low for it to be discharged in a stream of water. In the known method which was described above, the chelating resin having nitrogen ligands may be of the Na-type, Ca-type or H-type. However, H-type resins are preferable, because their regeneration by means of an aqueous solution of hydrochloric or sulfuric acid is facilitated. However, the aqueous sodium chloride solutions obtained at the end of the method using H-type resins, has a calcium level which is too high to allow them to be used in an industrial method such as, for example, electrolysis.

The present invention remedies this drawback by providing a valuable industrial method for aqueous sodium chloride solution as a result of washing fumes.

SUMMARY OF THE INVENTION

Consequently, the invention relates to a manufacturing method of an industrial sodium chloride solution wherein an industrial aqueous solution of sodium chloride containing metals having a valency greater than 1 is treated on a chelating Na-type resin. The process is characterized in that in order to obtain the aqueous sodium chloride solution containing metal having a valency greater than 1, the fumes containing hydrogen chloride and metal having a valency greater than 1 and resulting from the oxidation of chlorinated products are subjected to washing with acidified water; an aqueous solution of hydrochloric acid is collected from the wash, and the hydrochloric acid solution is alkalinized in order to precipitate metal having a valency greater than 1 to a state of hydroxides which are separated chloride and resulting from the oxidation of chlorinated products.

BRIEF DESCRIPTION OF THE DRAWING

The FIGURE is a schematic illustration of an installation for purifying fumes originating from the calcination of household or municipal waste, and to increase the value of the effluent obtained from the purification of these fumes.

DETAILED DESCRIPTION OF THE INVENTION

In the method according to the invention, an industrial aqueous solution of sodium chloride designates an aqueous sodium chloride solution intended to affect the technical activity of an industry.

In the method according to the invention, an aqueous solution is used which is obtained from fumes derived from the oxidation of chlorinated products. The latter may generally comprise chlorinated hydrocarbons and chlorinated polymers, for example, chlorobenzene, chloroform, vinyl polychloride or vinylidene polychloride. Consequently, these fumes contain hydrogen chloride. Moreover, they contain polyvalent metals. The latter may be obtained from various sources (stabilizers of polymer substances metallic impurities of chlorinated products subjected to oxidation or mixed with the latter, metallic impurities of possibly used fuel). Calcium, magnesium, aluminum, chrome, iron, molybdenum, lead, strontium and zinc are polyvalent metals present in fumes.

The washing is effected by acidified water water. Usually acidified water having pH below 7 is used. The quantity of washing water and its pH must be regulated in such a way as to dissolve the hydrogen chloride and the polyvalent metals present in the treated fumes. An aqueous solution of hydrochloric acid containing dissolved polyvalent metals is collected from the wash of the fumes. The pH of the washing water must be chosen in such a way as to prevent the dissolution of carbon dioxide and sulfur oxides that could possibly be present in the treated fumes. In practice, the quantity for the washing water and its pH is regulated in such a way that the pH of the aqueous solution obtained from the washing is less than 6.5, preferably 5, with values between 2 and 4 being particularly advantageous.

In the case of fumes containing sulfur oxides, it is advantageous for the acid washing to be followed by an alkaline washing, for example, by means of an aqueous sodium hydroxide or sodium (bi) carbonate solution.

The aqueous solution of hydrochloric acid collected from the wash of the fumes is subsequently alkalinized in order to precipitate the polyvalent metals that it contains as metal hydroxides. The aqueous suspension thus obtained is subsequently subjected to a mechanical separation in order to separate the precipitate of hydroxides from polyvalent metals. The mother liquor collected from the separation still contains dissolved polyvalent metals. It constitutes the aqueous solution of sodium chloride which is treated on a chelating resin.

The mother liquor obtained by the precipitation of polyvalent metals exhibits an alkaline pH and may be treated unaltered, for example, on chelating resin. It is advantageous to regulate its pH between 8 and 11. It is particularly advantageous to subject it to evaporation in order to concentrate it prior to treating it on a chelating resin.

The chelating resins that may be used in the method according to the invention are well known in the art. They comprise a polymer network on which functional complexing groups comprising interchangeable cations are grafted.

Examples of usable polymers for the polymer network comprise polyolefins (for example, polyethylene), polymers derived from styrene (for example, polymers derived from styrene and divinylbenzene) and acrylic resins. The term, Na-type chelating resin, is intended to designate a resin in which the interchangeable cations are sodium cations. The use of an Na-type chelating resin, according to the invention, ensures efficient extraction of polyvalent metal cations from the mother liquor (notably calcium ions) in accordance with the method described in the publication "The American Institute of Chemical Engineers, No. 219, Vol. 78, 1982, Pages 46–53: J. J. Wolff and R. E. Anderson, Ion-Exchange Purification of Feed Brine for Chlor-Alkali Electrolysis Cells, the role of Duolite ES-467." At the end of the process, the resin must be regenerated which may be realized in a known manner by treating it successively with an aqueous hydrochloric acid solution and with an aqueous solution of sodium hydroxide. The resin is usually present in the form of granules, which make the mother liquor circulate on contact.

According to one particular realization of the invention, a chelating resin of which the functional groups comprise a nitrogen ligand, is particularly advantageous. The latter may, for example, comprise compounds derived from amines or imines. Of the chelating resins especially recommended are those comprising functional groups derived from organic acids; those comprising functional groups derived from iminodiacetic acid or aminophosphonic acid are preferred. Such resins are primarily described in U.S. Pat. No. 4,002,564 (DIAMOND SHAMROCK CORP.) and in EP Patent Application 0,087,934 (DUOLITE INTERNATIONAL S. A.). Examples resins usable in the method according to the invention are those marketed under the name of DUOLITE (ROHM & HAAS COMPANY) and LEWATIT (BAYER AG). In the special case where an aqueous solution obtained from washing fumes contains mercury, it is advantageous to precede the treatment on a resin-containing nitrogen ligand by a treatment on a chelating resin containing sulfur ligands, as described in publication JP 60-38197.

In one particular implementation of the method according to the invention in which the aqueous hydrochloric acid solution obtained from washing fumes contains $SO_4^{2-}$ anions calcium chloride is added to the mother liquor collected after the separation of the precipitated hydroxides containing polyvalent metals and the sulfate is separated from the calcium which precipitates, prior to treating the mother liquor on the chelating resin. In this form of implementation of the invention, the calcium sulfate which precipitates is slightly contaminated. Due to this fact, it may be of ready value industrially or it may be disposed of as waste. Depending on the case, no specialized disposal is necessary, which constitutes an economic advantage.

Another especially advantageous realization of the method according to the invention relates to the case in which the aqueous solution obtained from washing fumes contains $SO_4^{2-}$ anions According to this form of the realization, a sufficient quantity of calcium hydroxide (for example, in the form of milk of lime) is added to this solution in order to co-precipitate the metallic hydroxides and calcium sulfate.

The aqueous solutions obtained at the end of the method according to the invention may be used as they are or be subjected to evaporation in order to concentrate them or to saturate them in sodium chloride.

The method according to the invention allows to obtain very pure industrial aqueous sodium chloride solutions, whose calcium ion content is less than 1 ppm. Notably, it allows to obtain aqueous sodium chloride solutions, which, after having been saturated in sodium chloride by partial evaporation, exhibit a content by weight of calcium of less than 0.1 ppm, generally not exceeding 0.05 ppm.

The aqueous sodium chloride solution obtained by means of the method according to the invention thus find diverse applications in industry. Notably, they may be used as raw material for producing sodium carbonate by the ammonia-soda method (Manufacture of Soda, Te-Pang Hou, Hafner Publishing Company, 1969) for the electrolytic manufacture of chlorine and aqueous sodium hydroxide solutions, for the electrolytic manufacture of aqueous sodium chloride solutions as well as for the manufacture of solid salt.

Consequently, the invention also relates to the use of an aqueous sodium chloride solution obtained by means of the method according to the invention for producing an aqueous sodium hydroxide solution by electrolysis or by electrodialysis. Methods for the electrolytic production of aqueous sodium hydroxide solutions are well known in the art and notably comprise the method in a mercury cathode cell and the method in a membrane cell selectively permeably to cations (Chlorine, Its Manufacture, Properties and Uses, J. S. Sconce, Reinhold Publishing Corporation, New York, 1962, Page 127 to 199; European Patent EP 0253,430 and Belgian Patent Applications 09,000,497 (now Belgian Patent 1,004,126) and 09,000,924, (now Belgian Patent 1,003,943) all three in the name of SOLVAY & Cie). The manufacturing method for aqueous sodium hydroxide solutions by electrodialysis are equally well known in the art (U.S. Pat. No. 2,829,095, NOGUCHI KENKYU-JO). According to the invention, an industrial aqueous sodium chloride solution obtained by the method in accordance with the invention described above, is used as raw material in electrolysis or electrodialysis.

Another object of the invention is the use of an aqueous sodium chloride solution obtained by means of the method in accordance with the invention described above in order to produce sodium chloride crystals. The production of very pure sodium chloride crystals by means of evaporating aqueous sodium chloride solutions is well known in the art (Sodium Chloride, Dale W. Kaufmann, Reinhold Publishing Corporation, New York, 1960, Pages 205 to 274; European Patent Application 0,352,847, SOLVAY & CIE). According to the invention, an industrial aqueous solution obtained by means of the method in accordance with the invention described above is used for the aqueous sodium chloride solution subjected to evaporation.

The invention realizes in an original and economic manner the value of residues originating from the purification of fumes. It is especially well adapted to the treatment of fumes generated by calcination installations for household and municipal waste.

Detailed characteristics of the invention will become apparent from the following description with reference to the sole FIGURE which is attached and which is a schematic drawing of an installation using a particular form of realization of each of the methods according to the invention.

The installation shown in the drawing is conceived to purify fumes originating from the calcination of household or municipal waste and to increase the value of the effluent obtained from the purification of these fumes. The treated household waste contains notably chlorinated residues. These chlorinated residues comprise polymeric products, for example, rubbish from polyvinyl chloride packaging, polyvinyl chloride construction material or vinyledene copolymer films. The calcination of household or municipal waste causes the oxidation of these chlorinated polymers such that the fumes obtained from the calcination contain hydrogen chloride. Additionally they contain sulfur dioxide originating from the combustion of sulfurous rubbish or the fuel used, as well as polyvalent metals (for example, aluminum, calcium, magnesium, chrome, iron, molybdenum, lead, strontium and zinc). These fumes are designated by reference numeral 1 on the attached drawing.

In the installation, the fumes 1 first pass through a dust removal device 2. The latter usually comprises a battery of electro-filters. The fumes obtained from the dust removing device 2 are sent to a washer-scrubber 3 where they are used to circulate counter-current to the washing water 4. Washing water having an acid pH is preferably used. The discharge of washing water and its pH are regulated in such a way that almost the entire hydrogen chloride and its polyvalent metals of the fumes enter the solution. On the one hand, one portion of fumes 5 which are practically free of hydrogen chloride are obtained from scrubber 3, and on the other hand, an aqueous solution 6 containing hydrochloric acid, sulfate ions, and polyvalent metals ions are obtained.

In a reaction chamber 7, the aqueous solution 6 is treated with a controlled quantity of an aqueous sodium hydroxide solution 8 such as to realize a pH value between 9 and 11 there and to precipitate the polyvalent metals in the hydroxide state. Then an aqueous suspension 9 of metallic hydroxides is dispersed in an aqueous sodium chloride and sodium sulfate solution and drawn off from reaction chamber 7. The aqueous suspension 9 is treated successively in a decantation chamber 10 and on a filter 11, where the insoluble substances which are discharged 12 are extracted from it. The mother liquor 13 obtained from filter 11 is transmitted to a reaction chamber 14 where a sufficient quantity of an aqueous calcium chloride solution 15 is added to it in order to precipitate the sulfate ions in the calcium sulfate state. The resulting aqueous suspension 16 is treated successively in a decantation chamber 17 and on a filter 18, where the precipitate of sulfate and calcium which is discharged 19 is extracted from it. The precipitated calcium sulfate 19 contains only a very small quantity of polyvalent metals and may then be transmitted unaltered into a storage for discharged residues.

The aqueous solution of sodium chloride 20 obtained from filter 18 contains a quantity of dissolved polyvalent metals which is usually too great to allow it to be used in an industrial method. According to the invention, it is made to circulate in a column 21 on contact with a chelating resin comprising functional Na-type groups derived from aminophosphonic acid derivatives. In column 21 an ion exchange then occurs between the resin sodium cations and the polyvalent cations of the aqueous solution 20. An industrial aqueous sodium chloride solution 22 of sufficient purity to be used unaltered in an industrial method is then obtained from column 21. For example, in the installation shown in the drawing the aqueous solution 22 is divided into two fractions 23 and 24.

Fraction 23 is transmitted, according to the invention, to an electrolysis cell 25 equipped with membranes selectively permeable to cations. In the electrolysis cell 25, solution 23 is subjected in a known manner to electrolysis leading to the production of chlorine 26 and an aqueous sodium chloride solution 27.

Fraction 24 is transmitted to an evaporator 28, from which the crystallized sodium chloride 29 and water vapor 30 is obtained. The solid sodium chloride 29 has a variety of industrial applications.

The chelating resin of column 21 must be regenerated periodically. To this end, column 21 is insulated from conduits 20 and 22 by means of insulating valves 31 and 32, operated in successive stages, as described in the publication "The American Institute of Chemical Engineers, No. 219, Vol. 78, 1982, Pages 46–53: J. J. Wolff and R. E. Anderson, Ion-Exchange Purification of Feed Brine for Chlor-Alkali Electrolysis Cells; The Role of Duolite ES-467." In a first phase, an aqueous hydrochloric acid solution is introduced into column 21 by way of conduit 33 in order to substitute protons on the active sites of the chelating resin and, a diluted aqueous solution of hydrochloric acid containing polyvalent metals is obtained by way of conduit 34. In the second phase, an aqueous sodium hydroxide solution is introduced by conduit 33 in order to substitute sodium cations with protons of the active sites of the resin, and a diluted aqueous sodium hydroxide solution is obtained by way of conduit 34.

The fumes 4 obtained by scrubber 3 sometimes have an excessive content of sulfur oxides. If necessary, they are transmitted into a reactor 35 where they are treated with a sodium bicarbonate solution 36. From reactor 35 are obtained, on the one hand, fumes 37 which are practically free from sulfur oxides, and on the other hand, an aqueous solution of sodium sulfate 38, which is combined with solution 13 upstream of the reaction chamber 14.

In one modification of the method, the diluted solution of sodium hydroxide obtained from conduit 34 during the second phase of the regeneration of the resin is recycled in chamber 7 after having possibly been concentrated.

In another, preferred modification of the method the diluted hydrochloric acid solution and the diluted sodium hydroxide solution which have been obtained in the first phase and the second resin regeneration phases, respectively, are combined in adequate proportions, in order to form an aqueous sodium chloride solution (containing polyvalent metal), and the latter is recycled in reaction chamber 7.

The following example serves to illustrate the invention.

Fumes obtained by a calcination installation for household waste were filtered, then washed by spraying water into the fumes, and an acid solution was obtained. The latter was alkalinized by adding sodium hydroxide in order to realize a pH value equal to 10, and the aqueous suspension resulting from it was subjected to decantation and then filtration in order to eliminate insoluble substances. Two samples were taken from the mother liquor obtained from the filter.

A first sample was subjected to evaporation and a sodium chloride precipitate containing metallic impurities was obtained.

The second sample having a pH equal to 10, was treated in accordance with the invention, on a sodic-type chelating resin, LEWATIT (BAYER trademark).

In the table below are listed:

The composition of the unaltered mother liquor (column (1));

The composition of the sodium chloride precipitate obtained from the evaporation of the first sample of mother liquor (column (2);

The composition of the second sample of mother liquor, obtained downstream of the chelating resin (column (3)).

|  | (1) Mother Liquor (unaltered) (mg/kg) | (2) Precipitate (mg/kg) | (3) Mother Liquor (downstream of the resin) (mg/kg) |
| --- | --- | --- | --- |
| Al | 0.65 | 0.48 | <0.03 |
| Ba | 0.06 | 0.77 | 0.01 |
| Ca | 18.9 | 185 | 0.41 |
| Cd | 0.04 | 1.2 | <0.03 |
| Cr | 0.2 | 0.2 | <0.03 |
| Fe | 0.14 | 1.3 | <0.05 |
| Mg | 4.1 | 6.4 | 0.13 |
| Mo | 0.52 | 0.8 | 0.47 |
| Pb | 1.8 | 10.3 | <0.2 |
| Sr | 0.24 | 1.47 | 0.006 |
| Ti | 0.06 | 0.4 | 0.02 |
| Zn | 0.34 | 0.16 | <0.01 |

We claim:

1. A process for producing an aqueous sodium chloride solution comprising steps for:
   (a) washing a fume containing hydrogen chloride and metal compounds, the metal of said compound being polyvalent, with acidified water to dissolve said hydrogen chloride and metal compounds, to form an aqueous hydrochloric acid solution;
   (b) alkalinizing with sodium hydroxide said aqueous hydrochloric acid solution to a pH value of from 8 to 11, to form an aqueous suspension of metal hydroxide of said metal of said compounds;
   (c) separating said suspension into said metal hydroxide and a mother liquor containing dissolved polyvalent metal cations and aqueous sodium chloride;
   (d) treating said mother liquor on a chelating resin having sodium cations as interchangeable cations, to extract said dissolved metal cations from said mother liquor; and
   (e) separating an aqueous sodium chloride solution from the chelating resin.

2. Process according to claim 1, wherein the acidified water obtained from the washing has a pH ranging between 2 and 4.

3. Process according to claim 1, wherein the aqueous hydrochloric acid solution is alkalinized to a pH value ranging between 8 and 11 by dissolving sodium hydroxide in it.

4. Process according to claim 1, wherein, the aqueous hydrochloride solution obtained from washing the fumes contains $SO_4^{2-}$ ions, calcium chloride is added to the mother liquor obtained from the separation of metals having a valence greater than 1 from the hydroxide precipitate, and the sulfate precipitate is separated from the resulting calcium.

5. Process according to claims 1, wherein a chelating resin comprising nitrogen ligands is used.

6. Process according to claim 5, wherein the chelating resin comprises functional groups derived from iminodiacetic acid.

7. Process according to claim 1, wherein a resin comprising functional groups derived from aminophosphonic acid is used.

8. Process according to claim 1, wherein a chelating resin is regenerated by treating it successively with an aqueous hydrochloric acid solution and an aqueous sodium hydroxide solution.

9. The process according to claim 1, wherein the acidified water of step (a) has a pH less than 6.5.

10. The process according to claim 1, wherein the acidified water of step (a) has a pH less than 5.

11. A process for producing an aqueous sodium chloride solution comprising steps for:
    (a) washing a fume containing hydrogen chloride and metal compounds, the metal of said compound being polyvalent, with acidified water to dissolve said hydrogen chloride and metal compounds, to form an aqueous hydrochloric acid solution;
    (b) alkalinizing with sodium hydroxide said aqueous hydrochloric acid solution to a pH value of from 8 to 11, to form an aqueous suspension of metal hydroxide of said metal of said compounds;
    (c) separating said suspension into said metal hydroxide and a mother liquor containing dissolved polyvalent metal cations and aqueous sodium chloride;
    (d) treating said mother liquor on a chelating resin having sodium cations as interchangeable cations, to extract said dissolved metal cations from said mother liquor;
    (e) separating an aqueous sodium chloride solution from the chelating resin; and
    (f) electro(dia)lysis of said aqueous sodium chloride solution.

12. A process for producing sodium chloride crystals comprising steps for:
    (a) washing a fume containing hydrogen chloride and metal compounds, the metal of said compound being polyvalent, with acidified water to dissolve said hydrogen chloride and metal compounds, to form an aqueous hydrochloric acid solution;
    (b) alkalinizing with sodium hydroxide said aqueous hydrochloric acid solution to a pH value of from 8 to 11, to form an aqueous suspension of metal hydroxide of said metal of said compounds;
    (c) separating said suspension into said metal hydroxide and a mother liquor containing dissolved polyvalent metal cations and aqueous sodium chloride;
    (d) treating said mother liquor on a chelating resin having sodium cations as interchangeable cations, to extract said dissolved metal cations from said mother liquor;
    (e) separating an aqueous sodium chloride solution from the chelating resin; and
    (f) evaporating said aqueous sodium chloride solution to obtain sodium chloride crystals.

* * * * *